United States Patent [19]

Delfs

[11] Patent Number: 4,696,367
[45] Date of Patent: Sep. 29, 1987

[54] AUXILIARY HYDROSTATIC DRIVE SYSTEM

[75] Inventor: Larry M. Delfs, Cedar Falls, Iowa

[73] Assignee: Deere & Company, Moline, Ill.

[21] Appl. No.: 826,459

[22] Filed: Feb. 5, 1986

[51] Int. Cl.⁴ ............................................. B60K 17/34
[52] U.S. Cl. ..................................... 180/306; 60/420; 180/307
[58] Field of Search ............... 180/308, 305, 307, 306; 60/420, 426

[56] References Cited

U.S. PATENT DOCUMENTS

| | | | |
|---|---|---|---|
| 3,092,970 | 6/1963 | Sampietro | 180/308 |
| 3,481,419 | 12/1969 | Kress et al. | 180/243 |
| 3,506,081 | 4/1970 | Rumsey | 180/242 |
| 3,736,732 | 6/1973 | Jennings et al. | 180/308 |
| 4,140,196 | 2/1979 | Brewer | 180/307 |
| 4,244,184 | 1/1981 | Baldauf et al. | 60/420 |
| 4,570,741 | 2/1986 | McCoy | 180/308 |

Primary Examiner—John J. Love
Assistant Examiner—Eric D. Culbreth

[57] ABSTRACT

A combine includes a variable displacement, reversible delivery pump which drives main drive wheels via a main hydraulic drive unit and which drives a pair of steerable wheels via auxiliary hydraulic drive units. A pair of pressure-limiting and relieving valves are connected between the auxiliary drive units and the pump so that auxiliary drive units with lower pressure ratings than that of the main drive units can be used. The valves relieve pressure from the auxiliary drive units during dynamic braking.

8 Claims, 2 Drawing Figures

AUXILIARY HYDROSTATIC DRIVE SYSTEM

BACKGROUND OF THE INVENTION

The present invention relates generally to hydraulic drive systems and more specifically relates to an auxiliary hydraulic drive system for an agricultural combine.

Generally, a combine with which the present invention concerns itself comprises a vehicle body supported on a pair of main traction wheels and a pair of rear steerable wheels. Under most conditions, the main drive wheels propel the combine. However, under some conditions, the main drive wheels may spin out and not provide the tractive force necessary. This is particularly true in the case of a combine wherein the weight of grain in the grain tank varies to a considerable extent and may vary, by more than two to one, the weight on the rear steerable wheels.

As the weight of the rear steerable wheels increases and the main drive wheels become unable to provide sufficient tractive force, it is desirable to drive the steerable rear wheels to provide the additional force necessary to propel the combine, such as described in U.S. Pat. No. 3,736,732 issued in 1973 to Jennings et al and assigned to the assignee of this invention. It would further be desirable to provide such a system with the capability of using auxiliary drive units which have a lower pressure rating than that of the main drive unit.

SUMMARY OF THE INVENTION

It is an object of the present invention to provide an auxiliary hydrostatic drive system which can accommodate main and auxiliary hydrostatic drive motors which have differing pressure ratings.

It is another object of the present invention to accomplish on-off control of the auxiliary drive motors with the pressure limiting valves which provide the dual pressure rating capability.

These and other objects are achieved by the present invention wherein a pair of 3-position, pressure-limiting valves control communication between both sides of the reversible hydraulic pump and the respective sides of reversible auxiliary hydrostatic drive units of an agricultural vehicle, such as a combine. Each valve has an open position, a closed position and a relief position wherein pump outlet pressure is connected to the pump inlet when pump outlet pressure is too high. An operator-controlled pilot may be added to each valve for operator on-off control of the auxiliary drive units.

DETAILED DESCRIPTION

Figure 1:
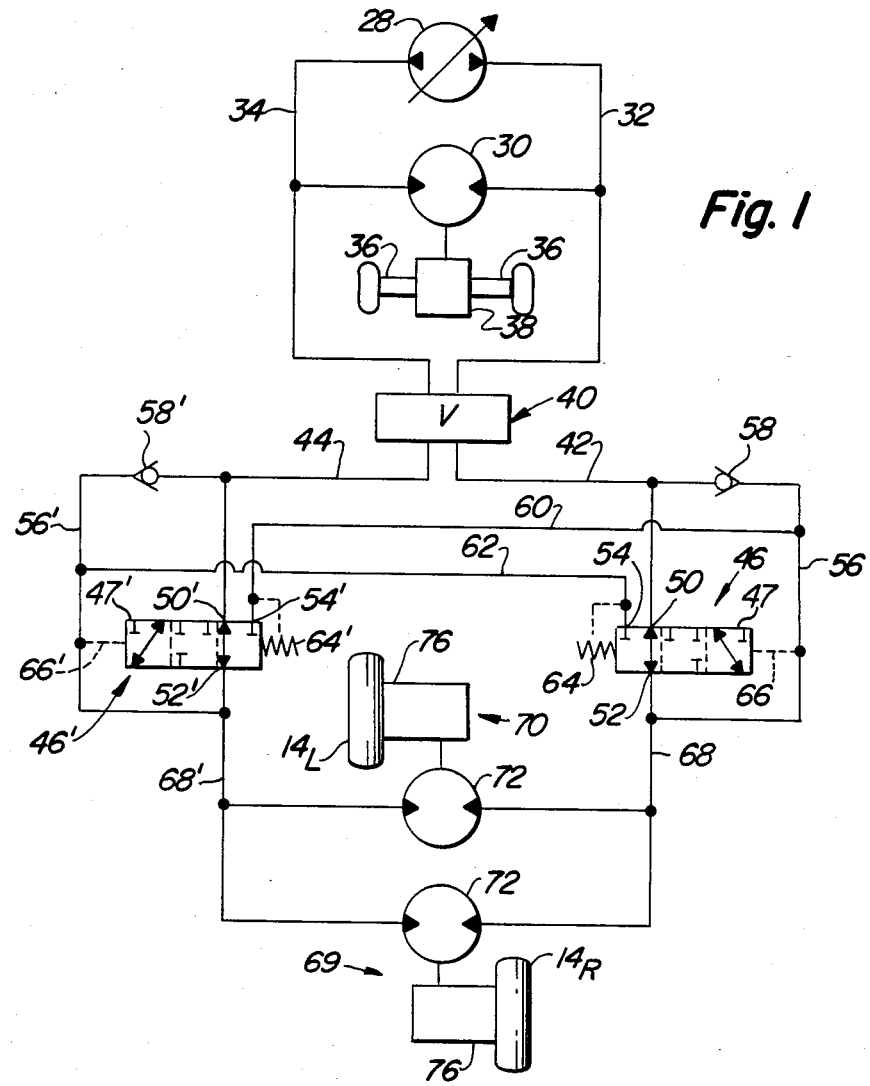
FIG. 1 is a schematic circuit diagram of a vehicle hydrostatic drive system according to the present invention.

The combine drive system for the front or main drive wheels (not shown) includes a variable displacement, reversible delivery pump 28 and a reversible hydraulic motor 30. The opposite sides of the pump 28 and motor 30 are interconnected by fluid lines 32 and 34 which alternatively act as supply and return lines, depending upon which direction the pump 28 supplies the fluid pressure. The pump 28 is driven by the engine (not shown) in any conventional manner, and the motor 30 is interconnected with the axles 36 for the main drive wheels (not shown) through a variable rate transmission and differential unit 38.

The auxiliary drive system for the steerable rear wheels 14R and 14L includes a pair of right and left-hand hydrostatic drive units 69 and 70 which are of similar construction. Each of the hydrostatic drive units includes a reversible hydraulic motor 72. The motors 72 of the hydrostatic drive units 69 and 70 are connected to reduction gear units or transmissions 76 associated with the wheels 14R and 14L, respectively.

A known production operator controlled selective control valve 40 controls communication of lines 32 and 34 with rear drives 69 and 70 via lines 42 and 44. According to the present invention, limiting and relief valves 46 and 46' with spools 47 and 47' are connected between motors 72 and control valve 40. Valves 46 and 46' include ports 50 and 50' connected to lines 42 and 44, respectively, ports 52 and 52' connected to opposite sides of fluid motors 72 and ports 54 and 54'. Branch lines 56 and 56' connect ports 52 and 52' to lines 42 and 44, respectively. Check valves 58 and 58' permit one-way fluid flow from motors 72 to lines 42 and 44, respectively. Line 60 connects branch line 56 to port 54' and line 62 connects branch line 56' to port 54. Springs 64 and 64'0 are biased to maintain valves 46 and 46' in the positions shown. Pilot lines 66 and 66' operate to move valves 46 and 46' in opposition to springs 64 and 64'. Lines 68 and 68' communicate ports 52 and 52', respectively, to opposite sides of the rear drive motors 72. Since the auxiliary or rear drive motors 72 are not in constant use, it will be desirable for them to have a lower pressure rating than that of the main or front drive motor 30.

MODE OF OPERATION

First, assume that pump 28 is pumping high pressure fluid into line 32 to pressurize one side of front drive motor 30 while line 34 collects low pressure fluid from motor 30 and communicates with the acting return port of pump 28. Also, assume that valve 40 is communicating lines 32 and 34 to lines 42 and 44, respectively, so as to energize the auxiliary or rear drive units 69 and 70. Then, valve 46 is normally held by spring 64 in a first position (shown) wherein line 42 is communicated with one side of rear drive motor 72 via ports 50 and 52. Valve 46' is similarly positioned.

If the pressure in line 68 exceeds the rating of rear drive motors 72 (4300 psi, for example), then pilot 66 will cause valve 46 to reduce or limit the pressure in line 68 to the rating pressure by restricting or blocking communication between ports 50 and 52.

When the rear drive motors 72 operate as brakes (with flow in the same direction), then the opposite valve 46' protects the motors 72 from the higher pressure in pilot line 66' and valve 46' moves to a third position wherein port 52' is communicated with port 54'. This dumps fluid from line 68' to line 68 via line 60 and line 56. Check valve 58' allows flow from line 68' to line 44 to occur even though port 50' is blocked. Of course, valve 46 operates in the same manner when motors 72 are driving and valve 46 operates in the same manner when motors 72 are braking and the direction of pump 28 is reversed.

Figure 2:
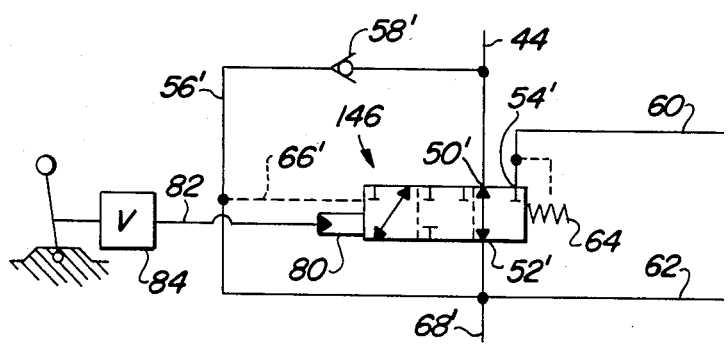
FIG. 2 is a diagram of an alternate valve according to the present invention.

FIG. 2 illustrates an alternate embodiment of the present invention wherein valve 46' is replaced by valve 146. Valve 146 and the circuitry connected to it is the same as that of valve 46' and FIG. 1, except that it includes a pilot 80 connected by line 82 to an operator-controlled valve 84. Also, in this case, the valve 40 can be eliminated and lines 34 and 32 connected directly to lines 44 and 42, respectively. Instead, with the embodiment of FIG. 2, valve 84 takes over the function of valve 40 of FIG. 1, in that low and high pressure communicated to pilot 80 will respectively open and close communication between ports 50' and 52', thus, controlling operation of auxiliary motors 72. Of course, valve 46 would be replaced by a valve similar to valve 146 to provide control of motors 72 in the reverse direction.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. An auxiliary drive system for a vehicle having a pair of main drive wheels, a pair of steerable wheels, a main reversible hydraulic motor, variable ratio transmission means for interconnecting the main hydraulic motor with the main drive wheels, a variable displacement, reversible delivery pump, and first and second fluid lines interconnecting opposite sides of the main motor with opposite sides of the pump, the auxiliary drive system comprising:
   a pair of reversible auxiliary hydraulic motors, each individually connected to one of the pair of steerable wheels;
   a directional control valve having first and second ports communicated with opposite sides of the pump and having third and fourth ports for communicating with the auxiliary drive motors;
   a third fluid line communicating the third port with a first side of each of the auxiliary hydraulic motors;
   a fourth fluid line communicating the fourth port with a second side of each of the auxiliary hydraulic motors; and
   a pressure-limiting and relieving valve means interposed in each of the third and fourth fluid lines for limiting pressures communicated to the auxiliary hydraulic motors to no greater than a limit pressure and for relieving pressure from a high pressure side of the auxiliary hydraulic motors to a low pressure side of the auxiliary hydraulic motors when the auxiliary hydraulic motors perform a dynamic braking function.

2. A vehicle hydrostatic drive system, comprising:
   a pump having a first port and a second port;
   a main hydrostatic drive unit powered by the pump and having a first pressure rating;
   an auxiliary hydrostatic drive unit having a second pressure rating which is lower than the first pressure rating;
   a first fluid line communicating one pump port with one side of the auxiliary drive unit;
   a second fluid line communicating the other pump port with another side or the auxiliary drive unit;
   a pressure limiting valve in the first fluid line for restricting fluid communication from the pump to the one side of the auxiliary drive unit to no greater than a limit pressure, the pressure limiting valve comprising:
   a first valve port communicated with one pump port, a second valve port communicated with the one side of the auxiliary drive unit and a third valve port communicated with the other side of the auxiliary drive unit;
   a spool movable to control communication between the first, second and third valve ports, the spool being movable to a first position wherein the first and second valve ports are connected and the third valve port is blocked and to a second position wherein the first, second and third valve ports are blocked;
   a pressure-responsive pilot connected to the second valve port and operable to move the spool from the first to the second position; and
   a resilient member biased to urge the spool toward its first position.

3. The hydrostatic drive system of claim 2, wherein:
   the spool of the pressure limiting valve is movable in response to fluid pressure in the pilot to a third position wherein the second and third valve ports are communicated with each other and wherein the first port is blocked.

4. The invention of claim 3, wherein:
   the second spool position is intermediate the first and third spool positions.

5. The invention of claim 2, further comprising:
   a bypass line communicating the one side of the auxiliary drive unit with the one pump port; and
   a check valve in the bypass line for permitting one way fluid flow from the auxiliary drive unit to the one pump port.

6. The invention of claim 2, further comprising:
   a further pressure-responsive pilot operable to move the spool from its first to its second position; and
   an operator-controlled pressure control valve coupled to the further pilot to control the fluid pressure therein.

7. The invention of claim 2, further comprising:
   an operator-controlled selective control valve connected between the pump and the pressure limiting valve.

8. The invention of claim 2, wherein:
   the pump and the auxiliary drive unit are reversible and the fluid cricuit includes a further identical pressure limiting valve, each pressure limiting valve being connected to respective sides of the pump and auxiliary drive unit.

* * * * *